US008335433B2

(12) United States Patent
Heywood et al.

(10) Patent No.: US 8,335,433 B2
(45) Date of Patent: Dec. 18, 2012

(54) WAVELENGTH DIVISION MULTIPLEXING SERIAL VIDEO SIGNALS OVER OPTICAL INTERFACES USING THE XFP FORM FACTOR

(75) Inventors: Gareth M. Heywood, Waterdown (CA); Ryan S. Latchman, Oakville (CA)

(73) Assignee: Semtech Canada Inc. (CA)

( * ) Notice: Subject to any disclaimer, the term of this patent is extended or adjusted under 35 U.S.C. 154(b) by 720 days.

(21) Appl. No.: 12/241,560

(22) Filed: Sep. 30, 2008

(65) Prior Publication Data

US 2009/0087183 A1 Apr. 2, 2009

Related U.S. Application Data

(60) Provisional application No. 60/976,944, filed on Oct. 2, 2007.

(51) Int. Cl.
 *H04J 14/02* (2006.01)
(52) U.S. Cl. .......................................... 398/79; 398/135
(58) Field of Classification Search ................. 398/79, 398/135
See application file for complete search history.

(56) References Cited

U.S. PATENT DOCUMENTS

| 7,371,014 | B2 | 5/2008 | Willis et al. |
| 2002/0058444 | A1 | 5/2002 | Sabotta et al. |
| 2005/0186810 | A1 * | 8/2005 | Sardella et al. ............. 439/76.1 |
| 2006/0216958 | A1 * | 9/2006 | Yee et al. ............................ 439/66 |
| 2008/0044141 | A1 * | 2/2008 | Willis et al. ........................ 385/88 |

FOREIGN PATENT DOCUMENTS

| JP | 2005-99769 | 4/2005 |
| JP | 2005-258268 | 9/2005 |
| JP | 2006-101432 | 4/2006 |
| JP | 2006-115516 | 4/2006 |
| JP | 2007-013504 | 1/2007 |
| JP | 2007-165470 | 6/2007 |
| JP | 2007-171980 | 7/2007 |

OTHER PUBLICATIONS

Canadian Intellectual Property Office, PCT International Search Report, dated Jan. 16, 2009, 3 pages.
Japanese Patent Application Serial No. 2010-527302, filed Mar. 31, 2010, Office Action dated Nov. 2, 2011 with translation.

* cited by examiner

*Primary Examiner* — Kinam Park
(74) *Attorney, Agent, or Firm* — Jones Day

(57) ABSTRACT

Certain pins of an XFP connector are re-purposed to enable the connector to receive, for example, four 11.88 Gb/s serial data streams (for a receiver), or output four 11.88 Gb/s serial data streams (for a transmitter). The four data streams are wavelength division multiplexed inside the XFP module for transmission over a single optical fiber, providing a total interface capacity of 47.52 Gb/s. An XFP receiver module is defined to convert the WDM signal back to four 11.88 Gb/s serial data streams.

16 Claims, 3 Drawing Sheets

WAVELENGTH DIVISION MULTIPLEXING SERIAL VIDEO SIGNALS OVER OPTICAL INTERFACES USING THE XFP FORM FACTOR

This application claims priority from copending U.S. Provisional Application No. 60/976,944, filed Oct. 2, 2007, and entitled Wavelength Division Multiplexing Four 3-to-12 Gb/s (nominal) Serial Video Signals Over Optical Interfaces Using the XFP Form Factor, which is hereby incorporated by reference for all purposes.

BACKGROUND

The present disclosure is directed generally to signal transmission and, more particularly, to the interfaces used in higher bandwidth video formats.

With the definition of higher bandwidth video formats, such as Ultra High Definition Television (UHDTV), interface capacities for the carriage of such formats must scale accordingly. UHDTV image formats require interface capacities ranging from 7.5 Gb/s up to 72 Gb/s. Using current HD-SDI interfaces, operating at 1.485 Gb/s, UHDTV requires multiple links, from 8 to more than 48, depending on the image format and sampling structure. This is not only a costly solution, but also technically challenging. All links need to be kept in synchronization, requiring additional hardware. The real estate required for all the HD-SDI "spigots" is considerable, leading to increased system costs. Finally, the cost and complexity of cabling is significant.

Another requirement within the video industry is to reduce the number of physical links (both electrical and optical) between facilities, equipment racks, and outside broadcast vehicles. This is also a requirement within large pieces of equipment, such as serial video routers. Combining multiple HD signals into a single optical fibre link reduces the cost of installations (less fibre runs required), and provides a more efficient use of cabling resources. Thus, a need exists to enable current installs using optical fibre to increase their capacity without increasing the number of optical fibres.

In the digital cinema (D-Cinema) industry, equipment has been developed using optical interface capacities of 10.692 Gb/s, standardized under SMPTE 435M. As D-Cinema formats become larger, they will eventually exceed the current 10.692 Gb/s interface capacity. Thus, a need exists to combine four 10.692 Gb/s signals, creating a very high bandwidth interface for current and future D-Cinema formats.

SUMMARY

This disclosure describes a method to transmit very high bandwidth video signals over a single optical fibre interface using wavelength division multiplexing (WDM) within an optical module. One instantiation of the disclosed technology uses the XFP form factor, defining the physical connections for the input of four 3 to 12 Gb/s (nominal) serial video streams, which when combined using WDM, produce a 12 to 48 Gb/s (nominal) capacity optical interface. This high bandwidth capacity interface can be used for the carriage of multiple high definition television (HDTV) signals, or next generation ultra high definition television (UHDTV) and D-Cinema formats.

The disclosed technology is used in Gennum's 11.88 Gb/s serial video data interface proposal for Ultra High Definition Television (UHDTV) for the transport of very high bandwidth video data. UHDTV image formats require interface capacities ranging from 7.5 Gb/s, up to 72 Gb/s. Gennum's UHDTV interface solution defines carriage of these large image formats in multiple 11.88 Gb/s optical interfaces. To reduce the number of optical interfaces required to carry these image formats, this disclosure proposes that an XFP connector be defined to accept four 11.88 Gb/s serial data streams (for a receiver), or output four 11.88 Gb/s serial data streams (for a transmitter). The four data streams are wavelength division multiplexed inside the XFP module for transmission over a single optical fibre, providing a total interface capacity of 47.52 Gb/s. An XFP receiver module is defined to convert the WDM signal back to four 11.88 Gb/s serial data streams.

The disclosed technology may also be employed in optical "combiner" solutions for other high definition serial video interfaces. In this case, four 2.97 Gb/s SDI signals (used for carriage of 1080p50/60 video formats), can be combined into an 11.88 Gb/s optical link. As described in the above paragraph, the four 3G-SDI signals are combined in a transmit or transmitter module using WDM and separated in a receiver module using wavelength division de-multiplexing.

BRIEF DESCRIPTION OF THE DRAWINGS

For the present disclosure to be easily understood and readily practiced, the disclosed technology will now be described, for purposes of illustration and not limitation, in conjunction with the following figures, wherein.

DETAILED DESCRIPTION

The proposed technology defines both an optical transmitter and receiver module, based on the XFP form factor. The XFP form factor was developed under the Multi Source Agreement (MSA) Group. The XFP MSA Group created the specification for the XFP module. The standard includes a cage design, a form factor (geometry, size, etc.), and IC interfaces. For example, a 10 Gbit XFP module converts serial electrical signals to external serial optical or electrical signals. The XFP module is hot pluggable and supports SONET [OC192/STM-64], 10G Fibre Channel, G.709, and 10 Gigabit Ethernet within the same module.

Figure 1:
FIGS. 1A and 1B illustrate the redefining (re-purposing) of XFP output pins to take advantage of the XFP connectivity.

The XFP electrical port has one Differential Transmit port [TD], one differential Receive port [RD], a differential reference clock [RefCK], and other additional control signals as shown in FIG. 1A. The XFP module uses three different power supplies; 1.8 v, 3.3 v, 5 volts, and an optional −5.2 volts.

The physical electrical interface of the XFP module is redefined as shown in FIG. 1B. In FIG. 1B, four pins (20, 22, 24, and 25), shown circled, are re-purposed. The standard definition of an XFP module is a transceiver, with a data input signal pair (pins 17 and 18) and data output signal pair (pins 28 and 29). This disclosure defines a receiver module and a transmitter module, each requiring four serial differential inputs (transmitter module) or four serial differential outputs (receiver module). These are labeled in FIG. 1B as D1+/D1− through D4+/D4−.

XFP modules are defined such that a complementary reference clock must be provided on pins 24 and 25, for the transmit data channel. One unique feature of the Gennum clock and data recovery (CDR) devices used in XFP modules is that the CDR devices do not require this reference clock.

Examples include the Gennum GN2003S, GN2004S, GN2013A, and GN2014A available from Gennum Corporation of Ontario, Canada. In this disclosure, the reference clock input pins are redefined (re-purposed) by an additional serial differential data pair. The Gennum module does not require a 1.8V power supply, defined as VCC2 (pins 20 and 22) in the XFP specification. This provides additional pins for the fourth serial differential data pair, defined in this disclosure.

Known wavelength division multiplexing (WDM) techniques allow multiple optical signals to be combined over a single fibre. Each optical signal is generated using a different wavelength before being optically multiplexed over the fibre. This disclosure brings the WDM inside the XFP module, such that no optical "circuitry" is required external to the module. A conceptual block diagram of both the XFP transmitter module 10 and receiver module 20 is show in FIG. 2. As mentioned above, the input signals may be 3 to 12 Gb/s (nominal) and the combined output stream 12 to 48 Gb/s (nominal). The blocks shown in FIG. 2 within the transmitter module 10 and receiver module 20 are functional and do not necessarily correspond to hardware.

In the transmitter module 10, each of the four received signals (D1-D4) goes through trace equalization and is retimed to produce a clean, properly timed data signal which is input to an optical transmitter. The outputs of the four optical transmitters are input to a wavelength division multiplexer which produces an output signal which can be carried by a single optical fibre.

Figure 2:
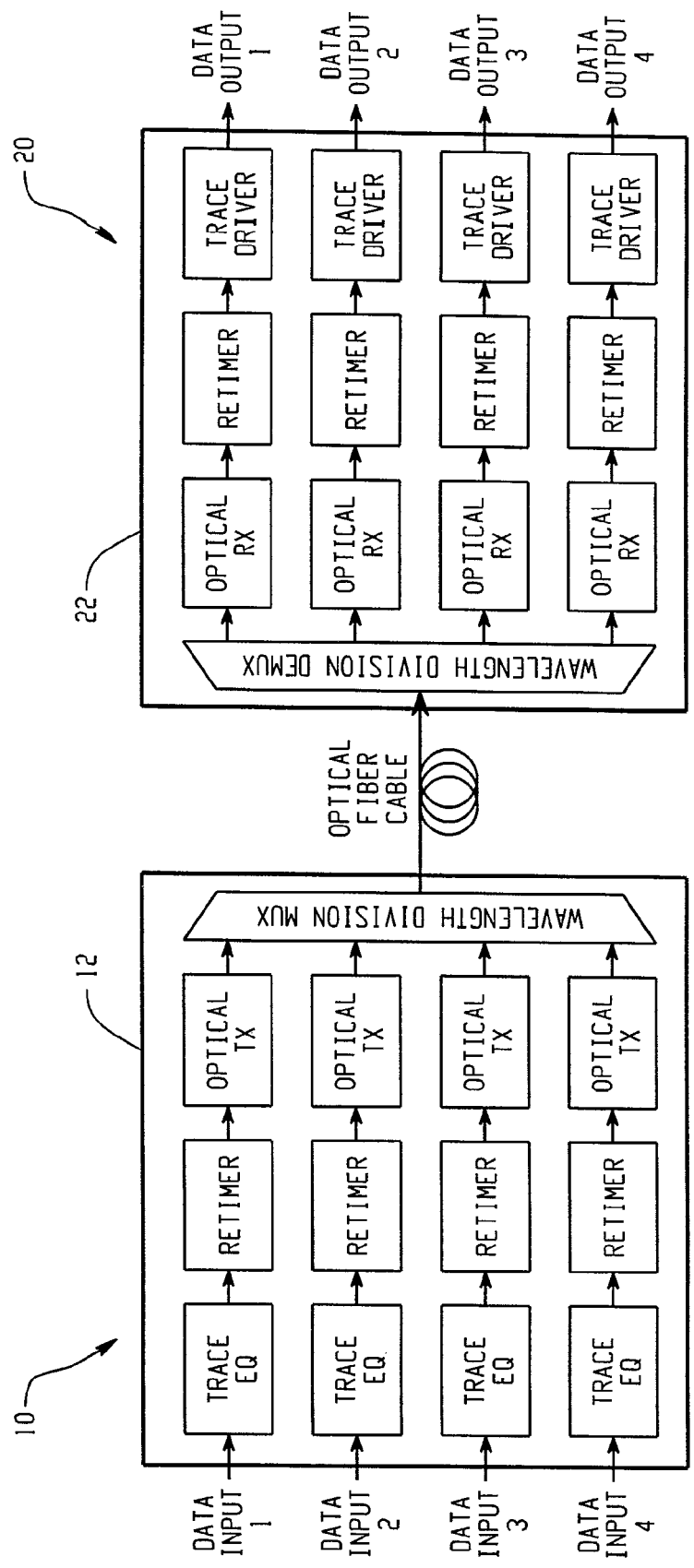
FIG. 2 is a conceptual block diagram of both the XFP receiver and transmitter modules.

In the receiver mode 20, the single signal is input to a wavelength division de-multiplexer which recovers the four individual signals which are each then input into one of four signal paths shown in FIG. 2, i.e., an optical receiver, re-timer, and trace driver.

From FIG. 2, it can be seen that a single, very high bandwidth optical fibre interface can be realized by combining four serial video data streams using wavelength division multiplexing. All the necessary electrical and optical components for transmission are contained within a device housing 12 meeting the XFP standard and all the necessary electrical and optical components for reception are contained within a device housing 22 meeting the XFP standard.

Figure 3:
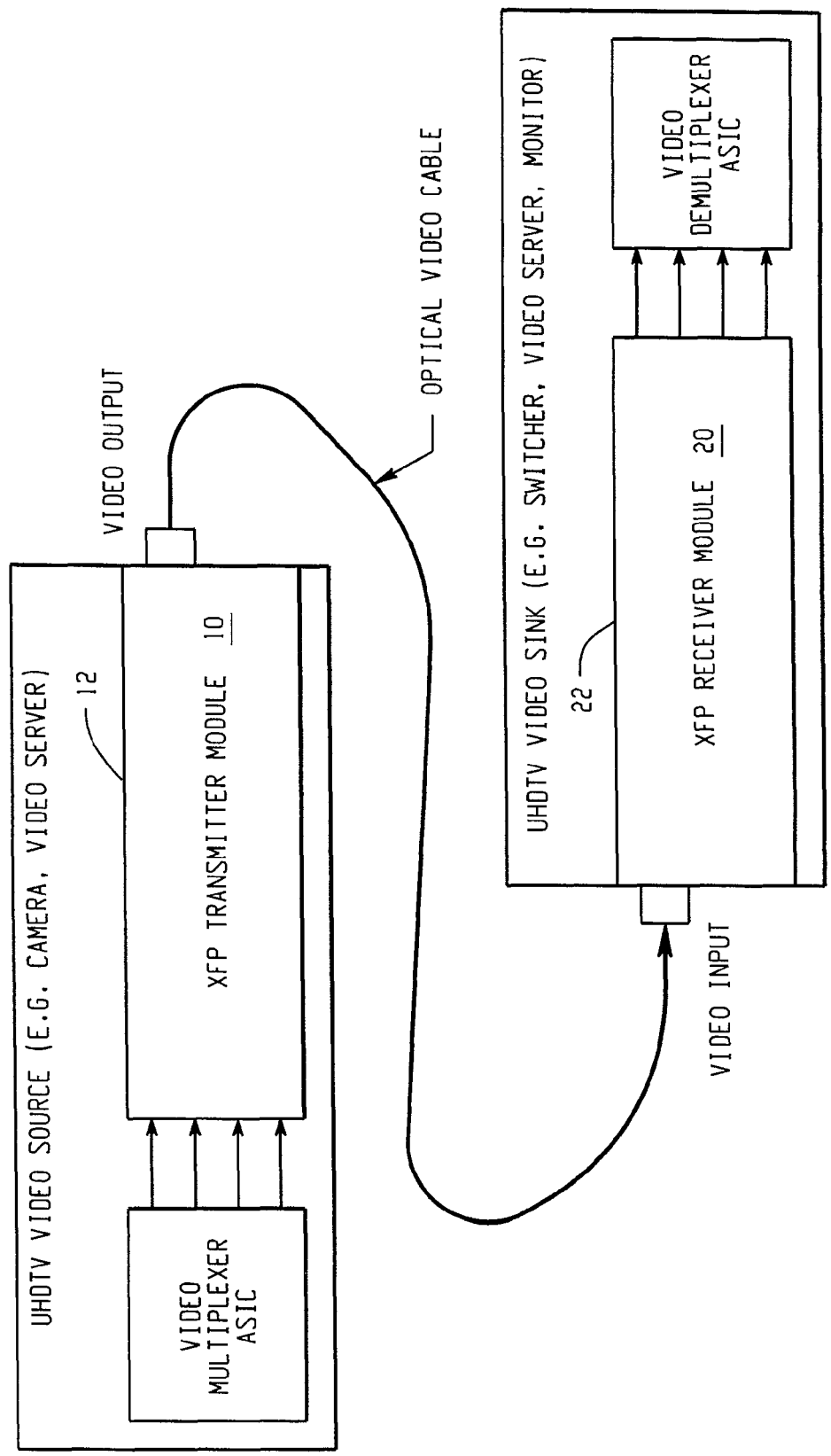
FIG. 3 is a high-level system block diagram using the receiver and transmitter modules shown in FIG. 2.

Turning to FIG. 3, FIG. 3 is a high-level system block diagram illustrating the transmitter module 10 and receiver module 20 shown in FIG. 2. FIG. 3 illustrates a video source comprising a video multiplexer ASIC providing the four data signals to the XFP transmitter module 10. The combined video output is transmitted over a single optical video cable to a video sink. The video sink is comprised of the XFP receiver module 20 which recovers and outputs the four data signals which are then input to a video de-multiplexer ASIC.

While the present disclosure has been described in conjunction with preferred embodiments thereof, those of ordinary skill in the art will recognize that many modifications and variations are possible. The following claims are intended to cover all such modifications and variations.

It is claimed:

1. An optical transmitter module for transmitting high bandwidth video signals over a single optical fibre using wavelength division multiplexing, comprising:
    a device housing having an XFP connector, wherein certain pins of the XFP connector are re-purposed for receiving a plurality of serial differential input (SDI) signals;
    a plurality of optical transmitter circuits contained within said device housing for converting said SDI signals into serial optical signals; and
    a wavelength division multiplexer contained within said device housing for combining said serial optical signals into an optically multiplexed signal for transmission over a single optical fibre.

2. The optical transmitter module of claim 1 wherein said certain pins that are repurposed for receiving the plurality of SDI signals include a pair of reference clock pins and a pair of power supply pins.

3. The optical transmitter module of claim 1 additionally comprising four optical signal paths, one signal path for each of the received SDI signals, each of said four optical signal paths providing for trace equalization and re-timing prior to inputting said signal to one of said plurality of optical transmitter circuits.

4. The optical transmitter module of claim 1 wherein said wavelength division multiplexer is configured to received four 3 to 12 Gb/s (nominal) serial optical streams and combine said streams to produce a 12 to 48 Gb/s (nominal) output signal, respectively.

5. An optical receiver module for receiving high bandwidth video signals that are transmitted over a single optical fibre, comprising:
    a device housing having an XFP connector, wherein certain pins of the XFP connector are re-purposed for outputting a plurality of serial differential input (SDI) signals;
    a wavelength division multiplexer contained within said device housing for receiving a high bandwidth video signal from a single optical fiber and for separating the high bandwidth video signal into a plurality of serial optical signals; and
    a plurality of optical receiver circuits contained within said device housing for converting said plurality of serial optical signals into a plurality of SDI signals to be output.

6. The optical receiver module of claim 5 wherein said certain pins that are repurposed for outputting a plurality of SDI signals include a pair of reference clock pins and a pair of power supply pins.

7. The optical receiver module of claim 5 additionally comprising four optical signal paths, one signal path for each of said plurality of optical receiver circuits, each of said four optical signal paths providing for re-timing and a trace driver for outputting said signal.

8. The optical receiver module of claim 5 wherein said wavelength division demultiplexer is configured to received a 12 to 48 Gb/s (nominal) signal and to produce therefrom four 3 to 12 Gb/s (nominal) serial optical streams, respectively.

9. A method of optically transmitting high bandwidth video signals over a single optical fibre using wavelength division multiplexing, comprising:
    receiving a plurality of serial differential input (SDI) signals at a device housing having an XFP connector, wherein certain pins of the XFP connector are re-purposed for receiving certain of said plurality of SDI signals;
    converting said SDI signals into serial optical signals; and
    combining said serial optical signals into an optically multiplexed signal for transmission over a single optical fibre using a wavelength division multiplexer.

10. The method of claim 9 wherein said receiving comprises receiving a plurality of SDI signals at XFP reference clock pins and XFP power supply pins re-purposed for the receipt of said SDI signals.

11. The method of claim 9 additionally comprising trace equalization and re-timing of each of said received SDI signals prior to said converting.

12. The method of claim 9 wherein said combining comprises combining four 3 to 12 Gb/s (nominal) serial optical streams to produce a 12 to 48 Gb/s (nominal) output signal, respectively.

13. A method of optically receiving high bandwidth video signals that are transmitted over a single optical fibre, comprising:

receiving a high bandwidth video signal from a single optical fibre;

separating the high bandwidth video signal into a plurality of serial optical signals;

converting said plurality of serial optical signals into a plurality of serial differential input (SDI) signals; and outputting said plurality of SDI signals using an XFP connector, wherein certain pins of the XFP connector are re-purposed for outputting certain of said plurality of SDI signals.

14. The method of claim 13 wherein said outputting comprises outputting a plurality of SDI signals at XFP reference clock pins and XFP power supply pins re-purposed for the output of said SDI signals.

15. The method of claim 13 additionally comprising re-timing and driving each of said SDI signals prior to said outputting.

16. The method of claim 13 wherein said separating comprises separating a 12 to 48 Gb/s (nominal) signal to produce therefrom four 3 to 12 Gb/s (nominal) serial optical streams, respectively.

* * * * *